United States Patent Office 2,902,345
Patented Sept. 1, 1959

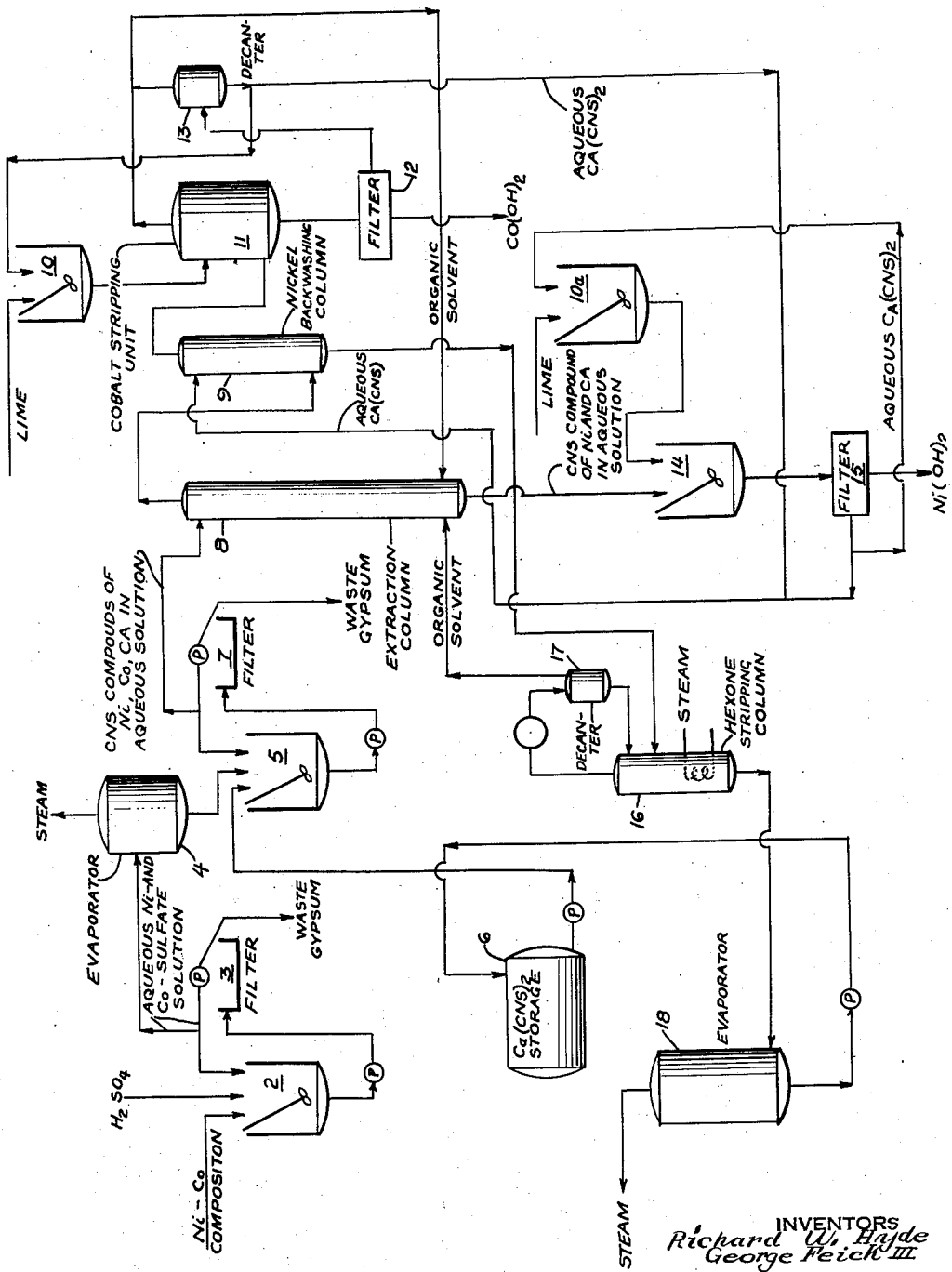

2,902,345

SEPARATE RECOVERY OF NICKEL AND COBALT FROM MIXED COMPOUNDS CONTAINING THE SAME

Richard W. Hyde, Lexington, and George Feick III, Needham, Mass., assignors, by mesne assignments, to Freeport Sulphur Company, New York, N.Y., a corporation of Delaware Application November 22, 1954, Serial No. 470,326

12 Claims. (Cl. 23—183)

This invention relates to the separate recovery of the nickel content and the cobalt content from ores or concentrates and from any other compounds or compositions containing such metals. More particularly the invention involves a process for the separation of ions of such metals by a liquid-liquid extraction procedure in which salts of the two metals are separated and recovered in concentrated form from the resulting solutions.

Because of the very similar chemical and physical properties of nickel and cobalt and their compounds their complete separation is a problem well known in industry. Potential commercial processes for the separation are generally cumbersome and moreover none of such processes can effect a complete simultaneous separation of the two metals or their ions. In these prior methods one of the metals can be separated in purified form but the other will contain some of the first metal as an impurity.

It has heretofore been experimentally determined that the nickel and cobalt in nickel and cobalt chloride mixtures could be separated by addition of ammonium thiocyanate to an aqueous solution of the same to form a complex with the cobalt followed by extracting this cobalt complex from the resulting aqueous solution through treatment with any one of a number of water-immiscible organic solvents for said cobalt complex. This process is not suitable for or adapted to commercial operation for several reasons, including the fact that it does not recover the metal contents in the form of useful compounds and does not utilize the reagents in an economically feasible way. Furthermore the chloride-thiocyanate solution formed is corrosive.

An object of the present invention is to provide a process for the separate recovery of nickel and cobalt from mixtures of the same, which effects complete separation of the metals in an economically successful way in which the reagent consumption is small and the metals may be recovered in the form of useful compounds from substantially non-corrosive solutions.

Broadly, the invention may be considered as involving the preparation of an aqueous solution of the nickel and cobalt content of the mixed composition containing the same in the form of their thiocyanates which solution also contains calcium thiocyanate, and extracting the cobalt thiocyanate compound or complex from said aqueous solution by taking up the same in methyl isobutyl ketone or other water immiscible organic solvent for said cobalt compound. Thereupon the nickel and cobalt are recovered from the respective solutions and the thiocyanate ions converted to calcium thiocyanate. This calcium thiocyanate is recycled in the process.

The invention is particularly applicable to the separate recovery of nickel and cobalt from ore concentrates obtained from lateritic ores containing such metals. In such concentrates the amount of nickel greatly exceeds the amount of cobalt and frequently the ratio is about 10 to 1. The invention, however, is also applicable to nickel and cobalt mixtures from any source including crude salts and concentrated solutions obtained in the recovery of nickel from scrap, and from sulfide ores such as those mined in Cobalt, Ontario.

In the treatment of ores, the nickel and cobalt may be extracted therefrom by either sulfuric acid leaching or ammonia leaching. If the latter procedure is employed, the nickel and cobalt are solubilized by the formation of an ammonium complex or complexes which are subsequently precipitated in the form of insoluble basic nickel and basic cobalt carbonates. When the free lime and magnesia content of the ores is high, ammonia leaching is preferred over sulfuric acid leaching. On the other hand, when the free lime and magnesia content is sufficiently low such that these materials do not consume large quantities of sulfuric acids, then sulfuric acid leaching is preferred. In this leaching operation the nickel and cobalt are, of course, solubilized in the form of their sulfates, and other metals in such ores such as aluminum and iron can be separated from the nickel and cobalt by known controlled precipitation techniques not constituting part of the present invention.

To prepare the thiocyanate solution of the nickel and cobalt content the raw material, if not already in the form of the required water-soluble salts, is treated with sulfuric acid or other acid, the calcium salt of which is substantially water-insoluble. If the nickel-cobalt concentrate has been obtained by sulfuric acid leaching, the composition containing the nickel and cobalt in the form of their sulfates is contacted and reacted with an excess of calcium thiocyanate solution which after the process is once started, includes the calcium thiocyanate later recovered in the process. In this reaction with calcium thiocyanate, gypsum is precipitated which upon filtration, leaves the nickel and cobalt in solution in the form of their thiocyanates in a solution substantially free of other anions. If the nickel-cobalt mixture has been obtained, instead, by ammonia leaching, then nickel and cobalt carbonates are formed therefrom and are converted to soluble thiocyanates by treatment with the calcium thiocyanate thereby forming calcium carbonate as a precipitate which on removal leaves the nickel and cobalt in the form of their thiocyanates in a solution substantially free of other anions.

In the production of aqueous solutions containing nickel and cobalt thiocyanates from the sulfates or carbonates, the amount of calcium thiocyanate added is in excess of that required to convert the nickel and cobalt content, for the free thiocyanate assists in the extraction efficiency of the step to follow. Five to seven mols of thiocyanate per mol of cobalt in excess of that necessary to convert all the nickel and cobalt to the simple $Ni(CNS)_2$ and $Co(CNS)_2$ salts gives, under most conditions, substantially complete separation of the cobalt in the extraction process. Experimentation indicates that the molar excess need never be more than about twelve. Excesses greater than this are operable but they merely increase the volume which must be handled and increase the losses of this reagent. On the other hand, if the excess is less than about five mols, then the extraction requires a greater number of theoretical stages in the extraction column and a greater volume of organic solvent must be circulated.

An alternative method for preparing the aqueous solution of nickel, cobalt and calcium thiocyanate involves the use of carbon dioxide instead of sulfuric acid. In this method the mixed nickel and cobalt compounds in the form of their hydroxides are slurried with an excess of calcium thiocyanate solution, and then carbon dioxide is introduced into the slurry in gaseous form. By this action, the nickel and cobalt are converted into their thiocyanates which are soluble and calcium carbonate is precipitated. The calcium carbonate is filtered from the mass leaving the thiocyanate solution in condition for the extraction step to follow.

The aqueous solution containing the nickel and cobalt thiocyanates together with the free calcium thiocyanate is next fed to an extraction column where it is contacted continuously and countercurrently with a suitable water immiscible organic solvent for the cobalt, a number of such solvents being already known to prior experimenters. Although methyl isobutyl ketone has been found to serve efficiently for this extraction, the other known water immiscible organic solvents may be employed, including other ketones, esters and alcohols. Ethyl acetate constitutes a second preferred solvent for the extraction.

The cobalt thiocyanate compound or complex is much more soluble in the organic phase than the nickel thiocyanate. Accordingly, the cobalt content can be taken up in the organic phase leaving the nickel content in the aqueous phase with the calcium thiocyanate. Whereas, complete separation of the nickel and cobalt can be obtained in the treatment of many mixed nickel-cobalt compositions of varying proportions, incomplete separation may occur when the composition treated contains higher concentrations of nickel in the solution. Under these conditions some of the nickel may be transferred to the organic phase, the amount not usually being in excess of from 10 to 20%. In accordance with the preferred procedure of the present invention for the treatment of high nickel content mixtures, the nickel carried over into the organic phase is removed by backwashing, using nickel-free calcium thiocyanate solution. The presence of thiocyanate in the aqueous phase serves to maintain the original cobalt distribution in favor of the organic phase, whereas the absence of nickel in this aqueous thiocyanate solution strongly favors the distribution of nickel to the aqueous phase.

The cobalt is preferably recovered from the organic phase by treatment with lime in slurry form. When contacted with an aqueous lime slurry both the cobalt and thiocyanate are extracted from the organic phase. The cobalt is precipitated as the hydroxide which can be recovered from the aqueous phase as by filtration or centrifuging leaving an aqueous calcium thiocyanate solution which is recycled in the process. Alternatively, the cobalt content may be recovered from the back-washed organic solution by firstly introducing thereinto ammonium hydroxide in a quantity which strips the cobalt and the thiocyanate from the organic phase (the cobalt-free solvent being recycled) and secondly, treating the resulting cobalt thiocyanate-rich ammonium hydroxide solution with lime whereby the ammonia is recovered for reuse and the cobalt is precipitated in the form of its hydroxide. The cobalt, thiocyanate-rich ammonium hydroxide solution may alternatively be treated with carbon dioxide in a quantity which precipitates the cobalt as the basic carbonate.

The cobalt-free, nickel-rich raffinate from the extraction column, is preferably likewise treated with lime slurry to precipitate nickel hydroxide which is similarly removed by filtration or centrifuging, and the calcium thiocyanate solution recovered is recycled in the process. If it is desired to operate the extraction step so as to leave some cobalt in the aqueous phase, the raffinate is treated with ammonium carbonate in a quantity which precipitates the cobalt.

In the operation of the invention the amount of water present is maintained at a minimum. Only that amount of water is preferably used which will permit flow of the various slurries and reaction masses. The process itself forms water and some water is desirably introduced into the system where filter cakes are washed to bring about maximum recovery. Since the process of the invention operates as a closed system the invention contemplates removal of water at one or more suitable places in the process. To obtain and maintain the desired high concentrations, any water in the cobalt and nickel sulfate or carbonate mixtures, as initially obtained, is partly or substantially wholly removed. In a preferred procedure the calcium thiocyanate solution recovered from the lime treatment reactions is also concentrated before being introduced into the mass of solubilized nickel and cobalt salts.

A specific example of the process will be described in connection with the accompanying drawing wherein the process steps and apparatus used in connection therewith are diagrammatically illustrated.

With reference to the drawing, a mixed cake of nickel and cobalt hydroxides (containing gypsum as an impurity), the ratio of nickel to cobalt being 10 to 1, is introduced into a reaction vessel 2 where it is mixed with sulfuric acid in an amount slightly in excess of stoichiometric proportions, as five percent or somewhat less, and with sufficient recycled sulfate solution from filter 3 to provide a slurry of flowable concentration. In the reaction vessel 2 the hydroxides of nickel and cobalt are converted to soluble sulfates. The reaction mass is next flowed to the filter 3 where the gypsum is removed from the solution and the cake is washed with water to recover residual solution. The filtrate from the filter is flowed to an evaporator 4 where most or substantially all of the water is preferably removed. A crystallizer (not shown) may be employed in the outlet of the evaporator to permit discharge of crystals from the evaporator system. By evaporating off the water to an extent which converts the nickel and cobalt into the form of their hydrated sulfate salts, the amount of water introduced into the closed cycle at this point in the process is reduced to the minimum.

The mixed hexa- and hepta-hydrated salts of nickel and cobalt sulfates, respectively, are conveyed or flowed from the evaporator and charged to a second reaction vessel 5 where a solution of the calcium thiocyanate containing 28 parts thereof in 72 parts of water from storage tank 6 is mixed therewith. In this vessel the metal sulfates are converted to the corresponding thiocyanate salts and simultaneously gypsum is precipitated. The slurry obtained in the tank is next pumped to the filter 7 where the gypsum is removed, leaving a clear aqueous solution of nickel and cobalt thiocyanates. This filter may likewise be washed with water to recover adhering solution. The solution contains approximately 66 grams of nickel and cobalt metal ions per liter of solution. This level of concentration in the vessel 5 is made possible by recycling a portion of the filtrate from the filter 7 which reduces the slurry concentration to a workable level for feeding to the filter 7. The filtrate from this operation contains about 60 grams of nickel ion and 6 grams of cobalt ion per liter of solution in the form of their soluble thiocyanate salts and contains calcium thiocyanate in solution in an amount equal to 6 mols of thiocyanate ion per mol of cobalt in addition to that which reacts in the formation of simple nickel and cobalt thiocyanate salts. The mixed calcium, nickel and cobalt thiocyanates solution obtained containing 14.3 parts nickel thiocyanate, 1.4 parts cobalt thiocyanate, 3.8 parts calcium thiocyanate, and 80.5 parts of water is then fed to the top of an extraction column 8 where it flows continuously and countercurrently with methyl isobutyl ketone at a solvent to aqueous solution ratio of about 1 to 2, in volumes.

The organic extract is flowed from the top of the extraction column 8 and is fed to the bottom of the nickel backwashing column 9 wherein it passes upwardly in countercurrent relation to a nickel-free calcium thiocyanate solution recovered in the process as hereinafter described, said solution being introduced into the top of said column. This operation removes the nickel which has been taken up in the organic phase in the extraction column 8 and produces a purified nickel-free cobalt extract containing 1.3 parts cobalt, 4.1 parts thiocyanate and 94 parts of methyl isobutyl ketone. The cobalt-rich organic extract from the column 9 is then fed into the bottom of the cobalt stripping unit 11 where it is reacted with lime fed thereinto from the mixing tank 10, the quantity being stoichiometrically equivalent to the cobalt. In this unit 11, the lime strips the cobalt ions from the organic phase and precipitates same as the hydroxide in the aqueous phase, while simultaneously stripping the thiocyanate ion from the organic phase and converting it to calcium thiocyanate in the aqueous phase.

The aqueous phase containing the cobalt hydroxide is flowed from the bottom of the unit 11 and passed to a suitable filter 12 where the cobalt hydroxide is removed from the solution. The filter cake may be washed free of thiocyanate to recover the same. Inasmuch as the filtrate may still contain some solvent, it is fed from the filter 12 to a decanter 13 to allow it to separate from the aqueous calcium thiocyanate solution. The separated organic solvent from the decanter 13 together with the solvent from the cobalt stripping unit 11 is recycled by introduction into the extraction column 8.

The aqueous raffinate containing 14.5 parts of essentially cobalt-free nickel thiocyanate, 3.15 parts of calcium thiocyanate and 81.5 parts of water obtained from the extraction column 8 is fed to a reaction vessel 14 where it is reacted with an equivalent quantity of lime in slurry form introduced thereinto from the mixing vessel 10a. In the vessel 14 the nickel content is precipitated in the form of its hydroxide and the thiocyanate is regenerated in the form of calcium thiocyanate, available for reuse in the process. The nickel hydroxide slurry from this vessel 14 is passed to a suitable filter 15 where the nickel hydroxide is removed from the solution. The residual thiocyanate solution in the filter cake may be recovered by a washing operation.

The methyl isobutyl ketone dissolved in the thiocyanate solution (to the extent of about 2%) is stripped off by flowing the aqueous calcium thiocyanate solution from the decanter 13 and that obtained from the filter 15 as well as that obtained from the nickel backwashing column 9 to a stripping column 16 referred to on the drawing as a "Hexone stripping column." The methyl isobutyl ketone forms a minimum boiling azeotrope with water composed of 75% of the ketone and 25% water. The mixture in the column 16 is next passed through decanter 17 where the organic solvent is removed and returned to the extraction column 8, the calcium thiocyante solution being returned to the column 16.

From the bottom of this column 16 the solution containing 8.3 parts of calicum thiocyanate and 91.7 parts of water is flowed to an evaporator 18 where water is evaporated therefrom to restore the concentration. In this evaporator the water produced in the process and that introduced in washing the various filter cakes is removed. From the evaporator, the concentrated solution flows to the storage tank 6.

It should be understood that the present invention is not limited to the specific details herein disclosed but that it extends to all equivalents which will occur to those skilled in the art upon consideration of the scope of the claims appended hereto.

We claim:

1. The process of separating nickel and cobalt from mixed compounds thereof which comprises preparing an aqueous solution containing substantially only the thiocyanates of nickel, cobalt and calcium, selectively extracting the cobalt thiocyanate compound from said solution by taking up the same in a water immiscible organic solvent for said cobalt compound, reacting the extracted cobalt thiocyanate and the nickel thiocyanate separately with lime to precipitate the nickel and cobalt in the form of their hydroxides leaving calcium thiocyanate in solution, separating the nickel hydroxide and cobalt hydroxide from the respective solutions and recycling the calcium thiocyanate.

2. The process of separating nickel and cobalt from mixed compounds thereof which comprises reacting the nickel and cobalt compounds in the form of water-soluble salts the anion of which in combination with calcium is a water-insoluble salt, with calcium thiocyanate in aqueous solution, separating the insoluble calcium salt formed from the remaining aqueous solution of the thiocyanates of nickel and cobalt, selectively extracting the cobalt thiocyanate compound from said aqueous solution containing calcium thiocyanate dissolved therein by taking up the cobalt compound in a water immiscible organic solvent for said cobalt compound, precipitating the cobalt and nickel from their respective solutions by reacting the compounds of said metals with lime, and recycling the calcium thiocyanate formed.

3. The process of separating nickel and cobalt from mixed compounds thereof which comprises reacting the mixed compounds in an aqueous medium with a solubilizing acid for the nickel and cobalt, the calcium salt of which acid is substantially water insoluble, adding to the reaction mass calcium thiocyanate in an amount in excess of that which reacts with the nickel and cobalt compounds, reacting the said compounds thereby forming an aqueous reaction mass containing the thiocyanates of nickel, cobalt and calcium, in solution, and an insoluble calcium salt, removing the insoluble calcium salt from the aqueous solution, selectively extracting the cobalt thiocyanate compound from said solution by taking up the same in a water immiscible organic solvent for said cobalt compound, precipitating the cobalt and nickel from their respective solutions while leaving the thiocyanate ions in solution by reacting the cobalt and nickel compounds with lime, thereby converting the thiocyanate ions into calcium thiocyanate, and recycling the calcium thiocyanate in the process.

4. The process in accordance with claim 1 wherein the extraction is effected by means of a continuous countercurrent liquid-liquid extraction.

5. The process of separating nickel and cobalt from mixed compounds thereof, which comprises preparing an aqueous solution consisting essentially of the thiocyanates of nickel, cobalt and calcium, selectively extracting the cobalt thiocyanate compound from said solution by direct countercurrent contact with a water immiscible organic solvent for said cobalt thiocyanate compound, purifying the extract containing a small percentage of nickel content by backwashing the organic phase with nickel-free recycled calcium thiocyanate, thereby removing residual nickel thiocyanate from the extract and leaving nickel-free cobalt thiocyanate therein.

6. The process in accordance with claim 5 wherein the resulting purified extract is reacted with lime slurry to strip the cobalt and thiocyanate from the extract, whereby the cobalt is precipitated as cobalt hydroxide and calcium thiocyanate is formed, said calcium thiocyanate being present in the aqueous phase of the two phase liquid obtained of which the other phase is said water immiscible organic solvent, separating the two phases of said liquid, removing said cobalt hydroxide precipitate from the organic phase and recycling the separated organic solvent and the aqueous solution containing calcium thiocyanate in the aforesaid process.

7. The process in accordance with claim 5 wherein the aqueous solution remaining after said direct countercurrent extracting step is mixed with lime slurry and the nickel is precipitated as nickel hydroxide and calcium thiocyanate is formed, and said calcium thiocyanate is returned for recycle in the process.

8. The process in accordance with claim 5 wherein the resulting purified extract is treated with ammonium hydroxide solution whereby the cobalt and thiocyanate are stripped from the organic phase and cobalt-free solvent is obtained for recycle and wherein the resulting cobalt, thiocyanate-rich ammonium hydroxide solution is treated with lime whereby the ammonia is recovered for reuse and the cobalt precipitate is in the form of its hydroxide.

9. The process in accordance with claim 5 wherein the resulting purified extract is treated with ammonium hydroxide solution to strip the cobalt and thiocyanate from the organic phase, treating the resulting cobalt, thiocyanate-rich ammonium hydroxide solution with carbon dioxide to precipitate the cobalt as the basic carbonate.

10. The process in accordance with claim 5 wherein the aqueous solution remaining after said direct countercurrent extracting step is treated with ammonium carbonate to precipitate the nickel as the basic nickel carbonate.

11. A process for the separate recovery of nickel and cobalt from compositions containing hydroxides of said metals which comprises, converting the said metals in such composition from their hydroxides to water soluble salts the acid radical of which in combination with calcium is a water-insoluble salt, reacting the water-soluble salts obtained with an excess of calcium thiocyanate in aqueous solution, separating the precipitated calcium salt formed from the solution comprising essentially the thiocyanates of nickel, cobalt and calcium, extracting the cobalt thiocyanate compound from such solution containing from about five to twelve mols of thiocyanate per mol of cobalt by taking up the same in a water immiscible organic solvent for said cobalt compound leaving the nickel compound dissolved in the aqueous solution, precipitating the cobalt and nickel from their respective solutions while leaving the thiocyanate ions in solution by reacting the cobalt and nickel compounds with lime, thereby converting the released thiocyanate ions into calcium thiocyanate, and recycling the calcium thiocyanate in the process.

12. The process of separating nickel and cobalt from mixed compounds thereof which comprises preparing an aqueous solution containing substantially only the thiocyanates of nickel, cobalt and calcium, selectively extracting the cobalt thiocyanate compound from said solution by taking up the same in methyl isobutyl ketone leaving the nickel content for the most part in the aqueous solution, precipitating the cobalt and nickel from the respective solutions by adding lime to the solutions, thereby also forming calcium thiocyanate and recycling the calcium thiocyanate in the process.

References Cited in the file of this patent

"Cyanogen Compounds," second ed., 1948, by Herbert E. Williams, pages 274, 280 and 299. Edward Arnold and Co., London.